(12) United States Patent
Pallis (10) Patent No.: US 10,076,186 B1
(45) Date of Patent: Sep. 18, 2018

(54) DEVICE HAVING FLATTENABLE CAVITIES AND PROTRUSIONS

(71) Applicant: Tina Marie Pallis, Mercer Island, WA (US)

(72) Inventor: Tina Marie Pallis, Mercer Island, WA (US)

( * ) Notice: Subject to any disclaimer, the term of this patent is extended or adjusted under 35 U.S.C. 154(b) by 254 days.

(21) Appl. No.: 13/999,584

(22) Filed: Mar. 10, 2014

Related U.S. Application Data (63) Continuation-in-part of application No. 12/965,686, filed on Dec. 10, 2010, now abandoned.

(60) Provisional application No. 61/852,416, filed on Mar. 15, 2013.

(51) Int. Cl.
| | |
|---|---|
| A47B 77/02 | (2006.01) |
| A47G 23/03 | (2006.01) |
| A47B 97/00 | (2006.01) |
| B32B 27/08 | (2006.01) |

(52) U.S. Cl.
CPC ............ *A47B 77/022* (2013.01); *A47B 97/00* (2013.01); *A47G 23/0303* (2013.01); *B32B 27/08* (2013.01); *Y10T 29/49886* (2015.01); *Y10T 428/2495* (2015.01); *Y10T 428/24355* (2015.01); *Y10T 428/24479* (2015.01); *Y10T 428/265* (2015.01)

(58) Field of Classification Search
CPC ............. B32B 27/08; Y10T 428/24355; Y10T 428/24479; Y10T 29/49886; Y10T 428/2495; Y10T 428/265; A47B 77/022; A47B 97/00; A47G 23/0303
USPC .................................. 428/141, 156; 29/458
See application file for complete search history.

(56) References Cited

U.S. PATENT DOCUMENTS

| | | | | |
|---|---|---|---|---|
| 5,948,707 A | * | 9/1999 | Crawley ................ | A41D 31/02 428/422 |
| 6,372,323 B1 | * | 4/2002 | Kobe ..................... | A63B 49/08 24/442 |
| 6,673,409 B1 | * | 1/2004 | Wheatley ................. | B60R 7/02 296/97.3 |
| 6,774,067 B2 | * | 8/2004 | Demott .................. | A47G 23/03 428/159 |
| 6,896,958 B1 | | 5/2005 | Cayton et al. | |
| 7,378,382 B2 | | 5/2008 | Serobian et al. | |
| 7,625,625 B2 | | 12/2009 | Rios et al. | |
| 7,921,500 B2 | | 4/2011 | Linzell | |
| 2008/0008856 A1 | * | 1/2008 | Weng ................ | A47G 23/0303 428/141 |

(Continued)

OTHER PUBLICATIONS

Owen, M.J., Why Silicones Behave Funny, Jul. 2010, Dow Corning Corporation, obtained from https://web.archive.org/web/20100714140547/https://www.dowcorning.com/content/publishedlit/01-3078-01.pdf (Year: 2010).*

*Primary Examiner* — Brian Handville (57) ABSTRACT

In accordance with the present invention, a device and method of buffering a surface while still maintaining the surface's visual appearance is disclosed. This invention relates to protecting a surface from deformation from objects placed on the surface while at the same time maintaining the surface's visual clarity and appearance. This invention may include the use of a sheet of silicone, some of the disclosed embodiments of which are uniquely configured with concave cavities and convex protrusions, and a wetting agent to achieve the stated buffering and visual appearance of the surface.

22 Claims, 11 Drawing Sheets

(56) References Cited

U.S. PATENT DOCUMENTS

2008/0245947 A1* 10/2008 Webb .................... A47G 19/10
                                                      248/683
2009/0064990 A1    3/2009 Wilkins et al.
2012/0328349 A1* 12/2012 Isaac .................. G06F 3/04886
                                                      400/491

* cited by examiner

DEVICE HAVING FLATTENABLE CAVITIES AND PROTRUSIONS

CROSS-REFERENCE TO RELATED APPLICATIONS

This application is a Continuation In Part of application Ser. No. 12/965,686, filed Dec. 10, 2010 and claims the benefit of Provisional Patent Application No. 61/852,416, filed Mar. 15, 2013, by the present inventor.

SEQUENCE LISTING OR PROGRAM

Not Applicable.

FIELD OF INVENTION

This invention relates to protecting a hard surface from deformation from hard objects placed on the surface while at the same time maintaining the clarity to the surface and more specifically to a device and method for achieving these stated qualities.

BACKGROUND

Deriving the full utility of a countertop, while at the same time enjoying the countertop appearance, is not always easy. Many countertop types that are popular today, for example the natural stone (granite or marble) countertop, the chic utilitarian concrete countertop, the tile countertop and the recycled glass countertop have a Brinell Hardness Number in excess of 500 and may therefore be classified as super hard surfaces. Also, in this category are engineered stone materials, such as those available under the trademarks Zodiaq® by Dupont®, Viatera® by LG and Eco® by Cosentino®.

Another category of materials commonly used for countertops is defined as having hard surfaces. Examples of materials in this category are laminates such as Formica® and Wilson Art®, and solid surfaces such as Corian®, HI-MACS®, glass, etc.

The above stated surfaces are subject to being easily deformed, such as scratched, abraded, scuffed, scorched, etc., when hard utensils are improperly placed on the surface or through normal wear. Additionally, the super hard surfaces do not appreciably yield to an applied force, for example when a kitchen user places a ceramic dish or glass drinking vessel on the countertop. Not only is there an unpleasant "clack" sound, but the user may perceive an unpleasant physical shock or jolt to the arm, due to the un-buffered contact of dish and countertop. This jolt, and the awareness of potential damage to dish or glass drinking vessel, may slow down the user in placing dishes on the countertop, when for example, unloading a dishwasher.

Also, those wishing to use the countertop as a surface on which to place a pot, pan, dishware or bakeware that is in the process of being cleaned by scrubbing, may find that there is an unpleasant grating noise caused by friction between the bakeware and the super hard countertop surface.

Accordingly, those wishing to get full and convenient use of a countertop, while still enjoying the countertop's elegant appearance, do not currently have a good option for achieving these objectives.

The term "countertop" as used herein is not limited to a kitchen environment, but includes any conceivable workspace with a top surface needing protection.

SUMMARY

In accordance with the present invention, a device and method of buffering a surface while still maintaining the surface's visual appearance is disclosed. This invention relates to protecting a surface from deformation from objects placed on the surface while at the same time maintaining the surface's visual clarity and appearance. This invention may include the use of a sheet of silicone, some of the disclosed embodiments of which are uniquely configured with concave cavities and convex protrusions, and a wetting agent to achieve the stated buffering and visual appearance of the surface.

BRIEF DESCRIPTION OF THE DRAWINGS

A better understanding of the embodiments of the device and method may be had by reference to the drawing figures wherein.

DETAILED DESCRIPTION OF THE EMBODIMENTS

Figure 1:
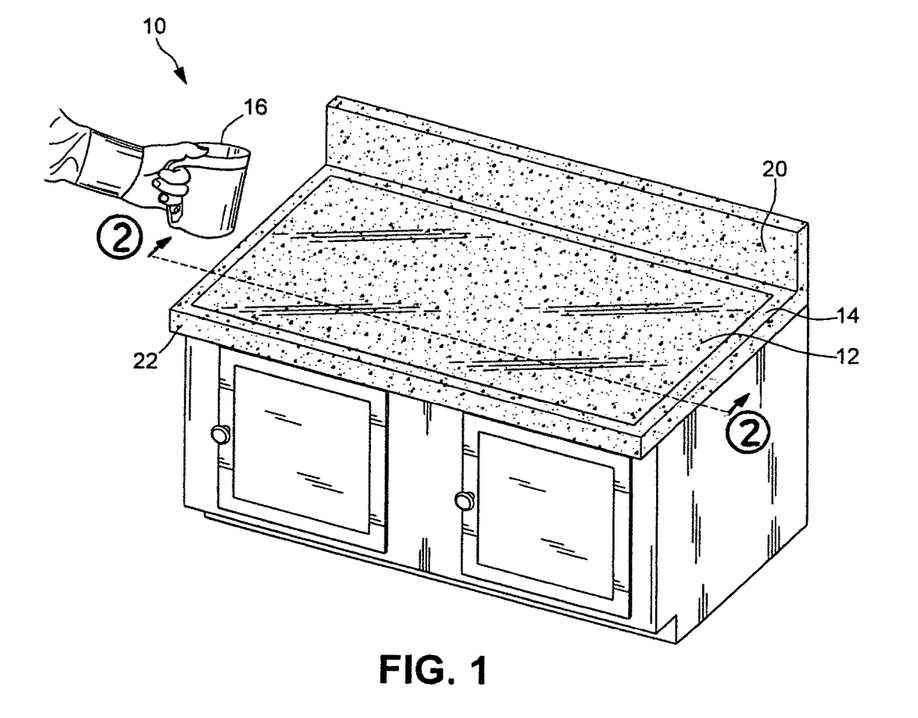
FIG. 1 is a perspective view of a cabinet having a countertop utilizing the present invention showing the unaltered beauty of the countertop while protecting the countertop's surface from an about to be placed utensil.
Figure 2:
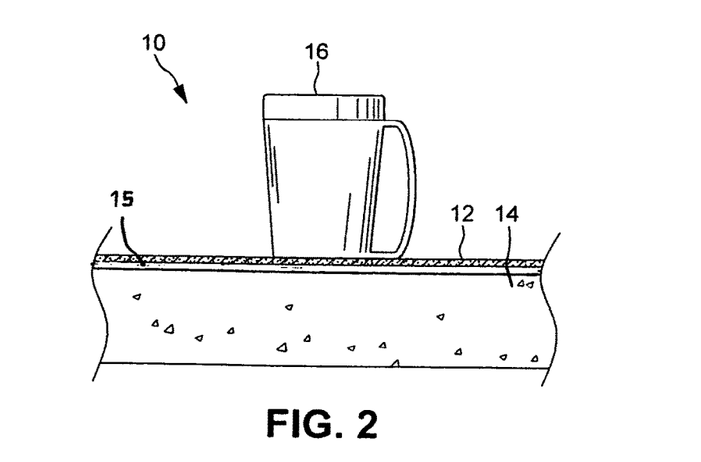
FIG. 2 is a cross sectional view showing the presence of a wetting agent at the interface of a silicone sheet of the present invention and the countertop's surface.
Figure 3:
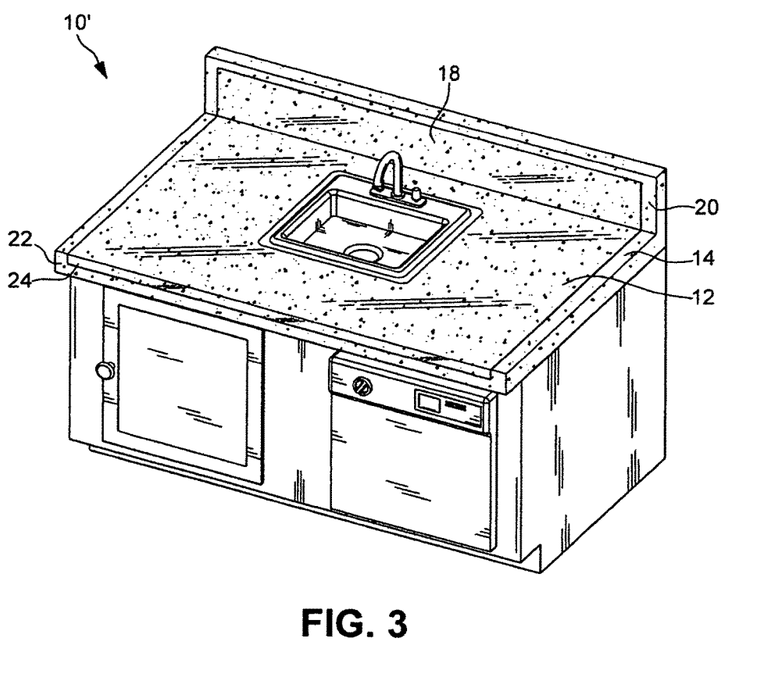
FIG. 3 is a perspective view showing the parameters of FIG. 1 applicable to both a countertop and a backsplash.

First Embodiment—FIG. 1, FIG. 2 and FIG. 3

Referring to FIG. 1, FIG. 2 and FIG. 3, a first embodiment of the present invention is shown. The first embodiment relates to a method of buffering the surface 14 of a countertop on a cabinet 10 while at the same time maintaining the surface's 14 visual appearance. The method includes wetting either (1) one surface of a substantially transparent silicone sheet 12, which may have a thickness of 4 mm or less, with a wetting agent 15 or (2) the countertop surface 14 with the wetting agent 15, or (3) both the surface of the silicone sheet 12 and the countertop surface 14 and then, placing the silicone sheet 12 adjacent to the countertop surface 14 so that the wetting agent 15 is located therein-between the silicone sheet 12 surface and the countertop surface 14 and finally, removing the resulting excess wetting agent and trapped air at the interface. Removal of the excess water and trapped air may be accomplished by rolling, with a force directed toward the sheet 12, the unwetted nearside surface of the silicone sheet 12 with a cylindrically shaped object such as a roller or a drinking glass; sliding an object over the upper surface of sheet 12 (which in this case must also be wetted) with a force directed toward the sheet 12; repeatedly placing a flat surface of an object against the silicone sheet 12 with a force directed toward the sheet 12; etc.

After accomplishing the above described method, it should be noted that the visual appearance and beauty of the countertop surface 14 is preserved as seen through the silicone sheet 12. The resulting uniform thin thickness of the wetting agent 15 and removal of air essentially does not effectively obstruct the light passing through the applied silicone sheet 12, and therefore, the visual appearance of the countertop surface 14 is maintained. Also, the interaction between the resulting uniform thin thickness of the wetting agent 15, the absence of air, the lower surface of the silicone sheet 12 and the countertop surface 14 helps to stabilize the silicone sheet 12 on the countertop surface 14.

In addition, since silicone is a relatively soft material, the applied silicone sheet 12 will buffer and thus protect the countertop surface 14 from deformation like scratches and scuffing from contact with a utensil 16 and other relatively hard objects and will also aid in keeping items in place, so as not to inadvertently slide. Furthermore, since the silicone surface 12 is relatively heat resistant, it will protect the countertop surface 14 from contact with hot utensils, such as utensil 16 and other objects without fear of the silicone melting or scorching when it comes into contact with hot objects. Moreover, the application of the first embodiment will aid in protecting a user from physical shock as described in the Background section.

Figure 4:
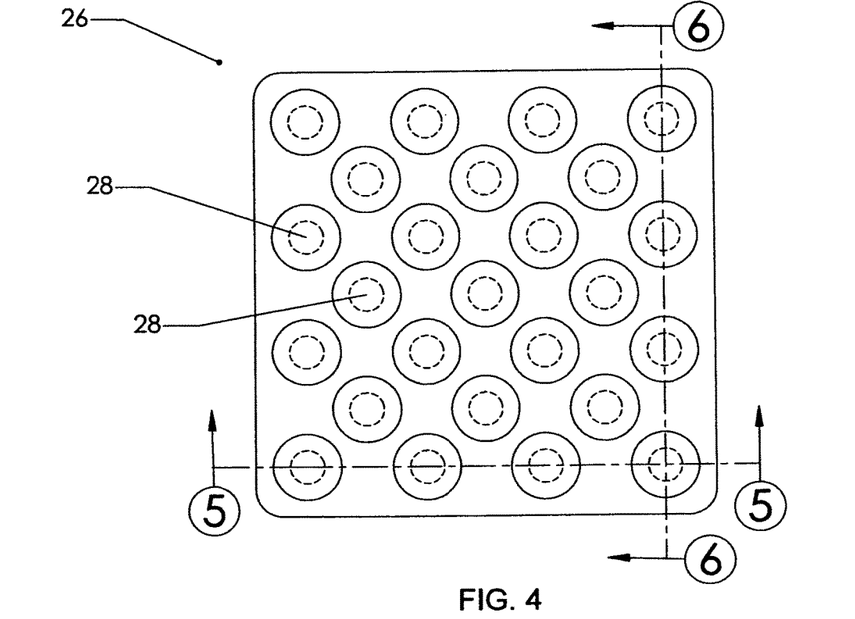
FIG. 4 is a first surface view of a silicone sheet of the present invention having substantially circular concave cavities and corresponding convex protrusions facing upwards.
Figure 5:
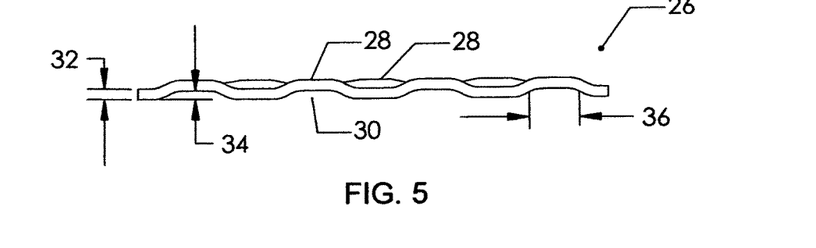
FIG. 5 is a cross sectional view of the silicone sheet shown in FIG. 4.
Figure 6:
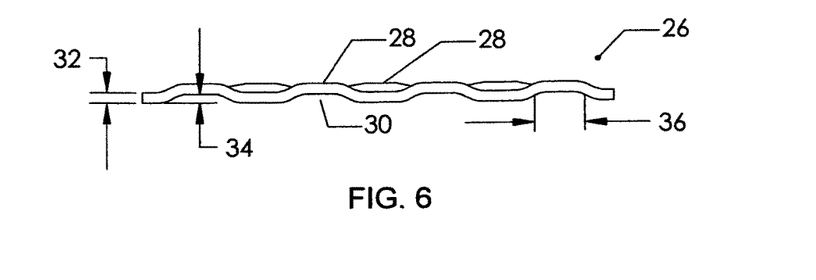
FIG. 6 is a cross sectional view of the silicone sheet shown in FIG. 4 orientated ninety degrees to that of FIG. 5.

Second Embodiment—FIGS. 4-6

Referring to FIGS. 4-6, a second embodiment of the present invention is shown. The second embodiment is a device for buffering the surface 14 of a countertop on a cabinet 10 while at the same time maintaining the surface's 14 visual appearance. The device includes a substantially transparent silicone sheet 26 having a plurality of spaced concave cavities 30 on its second side and corresponding convex protrusions 28 on its first side. Either the first side, the second side or both sides of sheet 26 can be specifically designed to be positioned on the countertop surface 14.

In the same manner as in the first embodiment, a wetting agent 15 is applied before placing the sheet 26 on the countertop surface 14 and then the air and excess wetting agent 15 is removed as stated in the first embodiment. If sheet 26 is designed for placement of the second side or concave cavities 30 next to the countertop surface 14, the concave cavities 30 trap air and wetting agent 15, thereby helping to stabilize the silicone sheet 26 on the countertop surface 14 when the air and excess wetting agent 15 are forced out by pressing on the corresponding convex protrusions 28. If sheet 26 is designed for placement of the first side or the protrusions 28 next to the countertop surface 14, the area between the protrusions 28 and the flat portion of sheet 26 contact surface trap air and wetting agent 15, thereby helping to stabilize the silicone sheet 26 on the countertop surface 14 when the air and excess wetting agent 15 are forced out by pressing on the pocket 30 side of sheet 26.

As with the first embodiment, adding a wetting agent 15 such as water to the interface between the countertop surface 14 and the sheet 26 further enhances both the visual preservation of the countertop surface 14 as seen through the sheet 26 and the stability of the sheet 26 on the countertop surface 14.

The thickness 32 may be relatively uniform throughout the sheet 26 and as a result, the upper surface of sheet 26 is essentially flat and planar when placed on a planar countertop surface 14 and the excess air and wetting agent 15 are removed. The thickness 32, can be uniform or vary throughout the sheet 26. The height 34 of the cavities 30 and the width and/or length 36 of the cavities 30 can be uniform or vary throughout the sheet 26. The thickness as measured between the cavities 30 and the protrusions 28 can be different from that of the thickness of the sheet 26. The transition from the cavities 30 and the protrusions 28 to the flat portion of sheet 26 can be gradual like a flattened or straightened "S" and have relatively large fillet radii and alternately, this transition area can be of any configuration.

To reiterate, the design of the second embodiment can be such that only the cavities 30 side or only the protrusions 28 side is positioned on the countertop surface 14 or the design can be such that either the pocket 30 side or the protrusions side 28 can be positioned on the countertop surface 14.

Operation of the Second Embodiment

To operate or install the second embodiment on a countertop surface 14 and in the same manner as in the first embodiment, a wetting agent 15 is applied before placing the sheet 26 on the countertop surface 14. The applicable side of sheet 26 is then placed on the countertop surface 14. Excess air and wetting agent 15 are then removed usually by rolling a cylindrical object over the unwetted nearside surface of the sheet 26 with a force directed toward the countertop surface 14. After excess air and wetting agent 15 have been removed, the sheet will follow the contour of the countertop surface 14 and the nearside surface of the sheet 26 will be essentially a uniform distance from the surface of the countertop surface 14 as shown in FIGS. 1, 2 and 3.

Third Embodiment—FIGS. 1-6

Referring to FIGS. 1-6, a third embodiment of the present invention is shown. The third embodiment relates to a method of buffering the surface 14 of a countertop on a cabinet 10 while at the same time maintaining the surface's 14 visual appearance. The third embodiment is the same as the first embodiment with the exception that sheet 12 is replaced with sheet 26. Furthermore, similar to the second embodiment, either the cavities 30 side or the protrusions 28 side, as dependent on the applicable design (reference the second embodiment), is positioned adjacent to the countertop surface 14.

Figure 7:
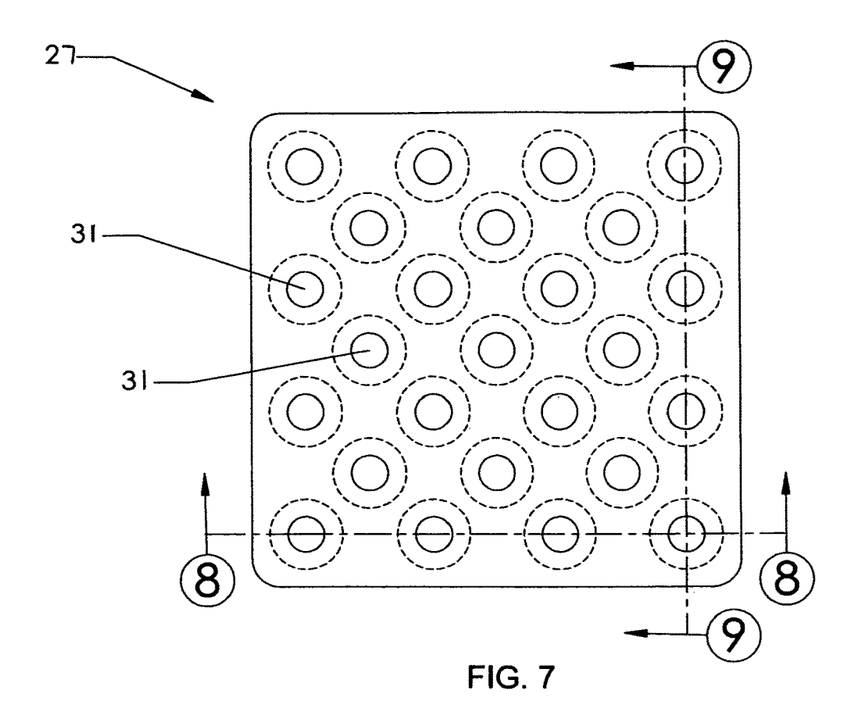
FIG. 7 is a first surface view of a silicone sheet of the present invention having substantially circular concave cavities and corresponding convex protrusions with the cavities facing upward.
Figure 8:
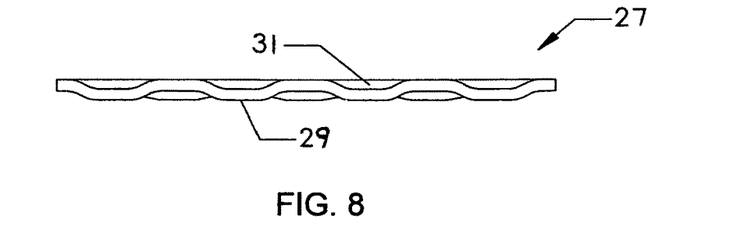
FIG. 8 is a cross sectional view of the silicone sheet shown in FIG. 7.
Figure 9:
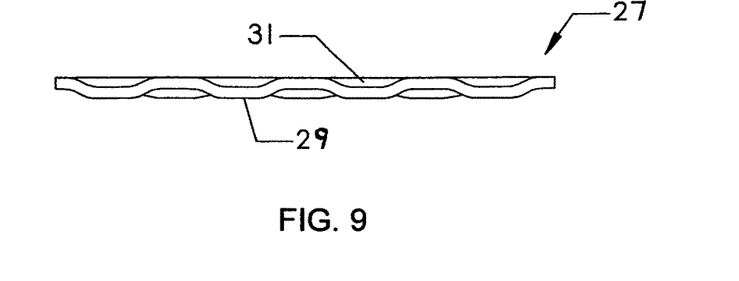
FIG. 9 is a cross sectional view of the silicone sheet shown in FIG. 7 orientated ninety degrees to that of FIG. 8.

Fourth Embodiment—FIGS. 7-9

Referring to FIGS. 7-9, a fourth embodiment of the present invention is shown. The fourth embodiment is a device for buffering the surface 14 of a countertop on a cabinet 10 while at the same time maintaining the surface's 14 visual appearance. The fourth embodiment is the same as the second embodiment with the exception that sheet 26 is replaced with sheet 27 where the protrusions 29 side is designed to be positioned adjacent to the countertop surface 14 and the cavities 31 side is designed to be facing away from the countertop surface 14.

Operation of the Fourth Embodiment

The operation of the fourth embodiment is the same as the second embodiment with the exception that sheet 26 is replaced with sheet 27.

Fifth Embodiment—FIG. 1, FIG. 2, FIG. 3, FIG. 7, FIG. 8 and FIG. 9

Referring to FIG. 1, FIG. 2, FIG. 3, FIG. 7, FIG. 8 and FIG. 9, a fifth embodiment of the present invention is shown. The fifth embodiment relates to a method of buffering the surface 14 of a countertop on a cabinet 10 while at the same time maintaining the surface's 14 visual appearance. The fifth embodiment is the same as the first embodiment with the exception that sheet 12 is replaced with sheet 27 and the protrusions 29 side is positioned adjacent to the countertop surface 14 with the cavities 31 side orientated away from the countertop surface 14.

Sixth Embodiment—FIG. 5, FIG. 6, FIG. 8, FIG. 9, FIG. 10 and FIG. 11

Figure 10:
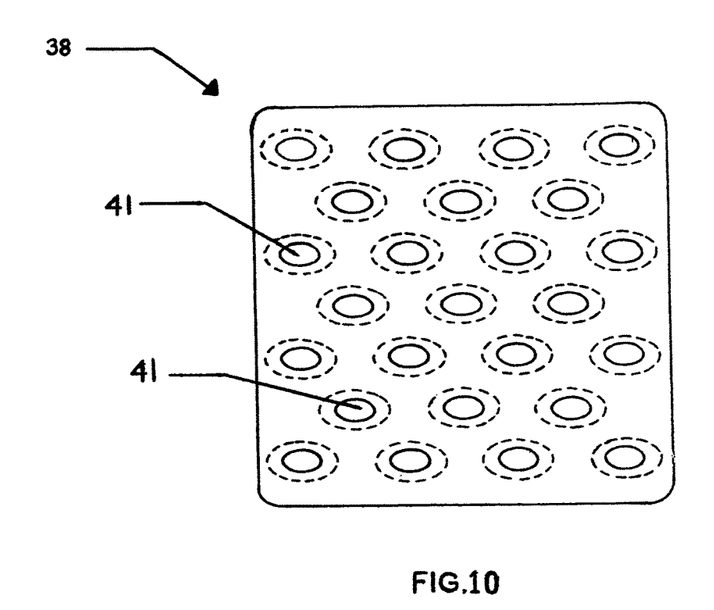
FIG. 10 is a first surface view of a silicone sheet of the present invention having substantially elliptical concave cavities and corresponding convex protrusions with the cavities facing upward.
Figure 11:
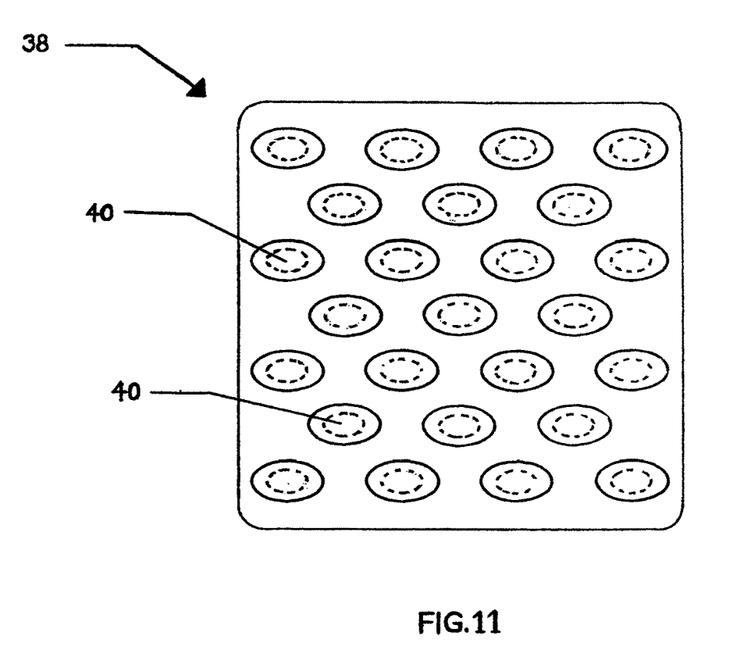
FIG. 11 is a second surface view of the silicone sheet shown in FIG. 10 showing the convex protrusions facing upward.

Referring to FIG. 5, FIG. 6, FIG. 8, FIG. 9, FIG. 10 and FIG. 11, a sixth embodiment of the present invention is shown. The sixth embodiment is a device for buffering the surface 14 of a countertop on a cabinet 10 while at the same time maintaining the surface's 14 visual appearance. The sixth embodiment is the same as the second embodiment with the exception that sheet 26 is replaced with sheet 38. In the sixth embodiment, the sheet 38 can be designed such that the protrusions 41 side is positioned adjacent to the countertop surface 14, as shown in FIG. 10 or the sheet 38 can be designed so that the cavities 40 side is positioned adjacent to the countertop surface 14, as shown in FIG. 11. The cross sections of sheet 38 may be similar to those shown in FIG. 5, FIG. 6, FIG. 8, and FIG. 9.

Operation of the Sixth Embodiment

The operation of the sixth embodiment is the same as the second embodiment with the exception that sheet 26 is replaced with sheet 38 and the appropriate side of sheet 38 is positioned adjacent to the countertop surface 14.

Seventh Embodiment—FIG. 1, FIG. 2, FIG. 3, FIG. 10 and FIG. 11

Referring to FIG. 1, FIG. 2, FIG. 3, FIG. 10 and FIG. 11, a seventh embodiment of the present invention is shown. The seventh embodiment relates to a method of buffering the surface 14 of a countertop on a cabinet 10 while at the same time maintaining the surface's 14 visual appearance. The seventh embodiment is the same as the first embodiment with the exception that sheet 12 is replaced with sheet 38 and the appropriate side of sheet 38 (reference the sixth embodiment) is positioned adjacent to the countertop surface 14.

Eighth Embodiment—FIG. 5, FIG. 6, FIG. 8, FIG. 9, and FIG. 12

Referring to FIG. 5, FIG. 6, FIG. 8, FIG. 9, and FIG. 12, an eighth embodiment of the present invention is shown. The eighth embodiment is a device for buffering the surface 14 of a countertop on a cabinet 10 while at the same time maintaining the surface's 14 visual appearance. The eighth embodiment is the same as the second embodiment with the exception that sheet 26 is replaced with sheet 42 and either the protrusions 44 side or the corresponding cavities side, as dependent on the applicable design (reference the second embodiment), is positioned adjacent to the countertop surface 14.

The cross sections of sheet 42 may be similar to those shown in FIG. 5, FIG. 6, FIG. 8 and FIG. 9.

Operation of the Eighth Embodiment

Figure 12:
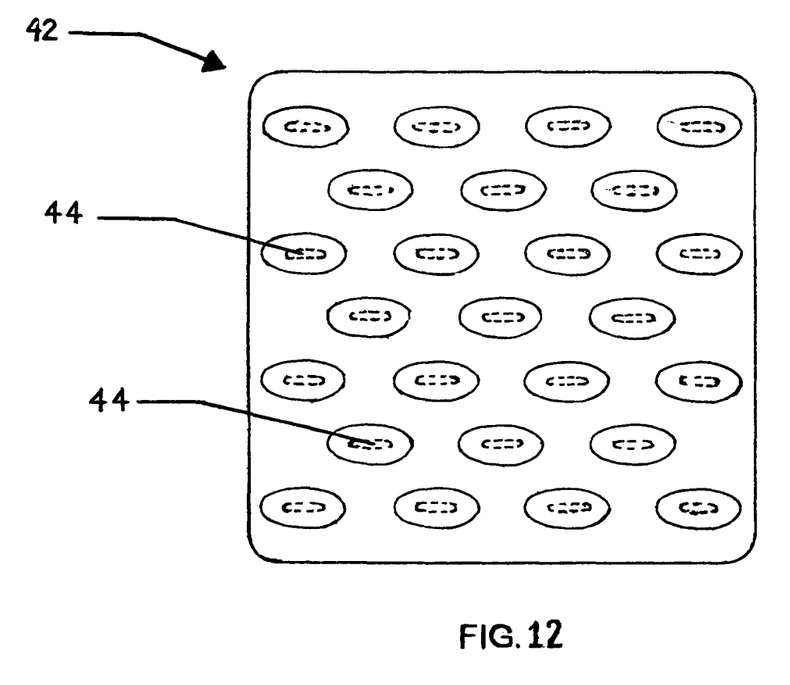
FIG. 12 is a first surface view of a silicone sheet of the present invention having substantially elliptical concave cavities and corresponding convex protrusions, different from those shown in FIG. 10, with the protrusions facing upward.

The operation of the eighth embodiment is the same as the second embodiment with the exception that sheet 26 is replaced with sheet 42.

Ninth Embodiment—FIG. 1, FIG. 2, FIG. 3 and FIG. 12

Referring to FIG. 1, FIG. 2, FIG. 3 and FIG. 12, a ninth embodiment of the present invention is shown. The ninth embodiment relates to a method of buffering the surface 14 of a countertop on a cabinet 10 while at the same time maintaining the surface's 14 visual appearance. The ninth embodiment is the same as the first embodiment with the exception that sheet 12 is replaced with sheet 42. Furthermore, similar to the second embodiment, either the protrusions 44 side or the corresponding cavities side, as dependent on the applicable design (reference the second embodiment), is positioned adjacent to the countertop surface 14.

Tenth Embodiment—FIG. 5, FIG. 6, FIG. 8, FIG. 9, and FIG. 13

Referring to FIG. 5, FIG. 6, FIG. 8, FIG. 9, and FIG. 13, a tenth embodiment of the present invention is shown. The tenth embodiment is a device for buffering the surface 14 of a countertop on a cabinet 10 while at the same time maintaining the surface's 14 visual appearance. The tenth embodiment is the same as the second embodiment with the exception that each protrusion 28 and its corresponding pocket 30 of sheet 26 are replaced with the protrusion 46 and its corresponding pocket. The cross sections of sheet 26, as modified, may be somewhat similar to those shown in FIG. 5, FIG. 6, FIG. 8 and FIG. 9 with the replaced pocket 46.

Operation of the Tenth Embodiment

Figure 13:
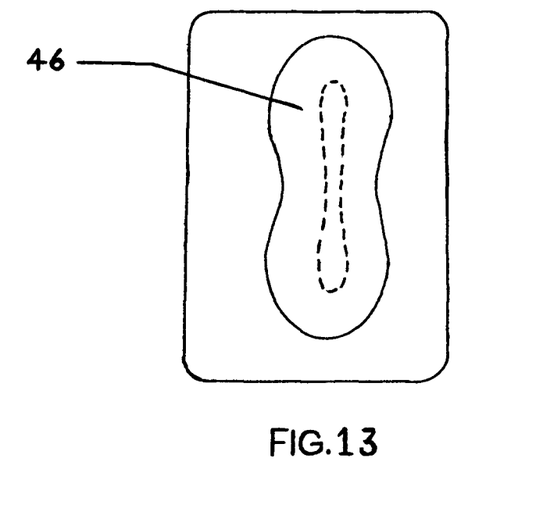
FIG. 13 is a first surface view of a protrusion of the present invention with a corresponding concave pocket having a shape different from those shown in FIGS. 4-11. The protrusion is shown facing upward.

The operation of the tenth embodiment is the same as the second embodiment with the exception that sheet 26 is replaced with a modified sheet with cavity 46.

Eleventh Embodiment—FIG. 1, FIG. 2, FIG. 3 and FIG. 13

Referring to FIG. 1, FIG. 2, FIG. 3 and FIG. 13, an eleventh embodiment of the present invention is shown. The eleventh embodiment relates to a method of buffering the surface 14 of a countertop on a cabinet 10 while at the same time maintaining the surface's 14 visual appearance. The eleventh embodiment is the same as the first embodiment with the exception that sheet 12 is replaced with the modified sheet as described in the tenth embodiment. Also, as described in the second embodiment, either the protrusion 46 side or the corresponding cavity side, as dependent on the applicable design (reference the second embodiment), is positioned adjacent to the countertop surface 14.

Twelfth Embodiment—FIG. 5, FIG. 6, FIG. 8, FIG. 9, and FIG. 14

Referring to FIG. 5, FIG. 6, FIG. 8, FIG. 9, and FIG. 14, a twelfth embodiment of the present invention is shown. The twelfth embodiment is a device for buffering the surface 14 of a countertop on a cabinet 10 while at the same time maintaining the surface's 14 visual appearance. The twelfth embodiment is the same as the second embodiment with the exception that sheet 26 is replaced with sheet 48. The cross sections of sheet 48 may be somewhat similar to those shown in FIG. 5, FIG. 6, FIG. 8 and FIG. 9.

Operation of the Twelfth Embodiment

Figure 14:
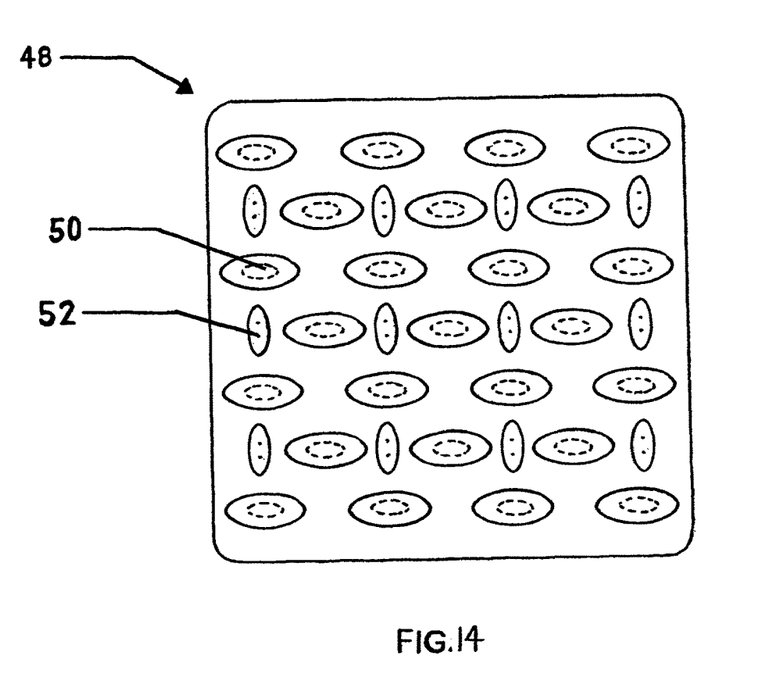
FIG. 14 is a first surface view of a silicone sheet of the present invention having concave cavities and corresponding convex protrusions with mixed shapes of different orientations with the protrusions facing upward.

The operation of the twelfth embodiment is the same as the second embodiment with the exception that sheet 26 is replaced with sheet 48.

Thirteenth Embodiment—FIG. 1, FIG. 2, FIG. 3 and FIG. 14

Referring to FIG. 1, FIG. 2, FIG. 3 and FIG. 14, a thirteenth embodiment of the present invention is shown. The thirteenth embodiment relates to a method of buffering the surface 14 of a countertop on a cabinet 10 while at the same time maintaining the surface's 14 visual appearance. The thirteenth embodiment is the same as the first embodiment with the exception that sheet 12 is replaced with sheet 48. Furthermore, similar to the second embodiment, either the protrusions 50 and 52 side and their corresponding cavities side, as dependent on the applicable design (reference the second embodiment), is positioned adjacent to the countertop surface 14.

Fourteenth Embodiment—FIG. 5, FIG. 6, FIG. 8, FIG. 9, and FIG. 15

Referring to FIG. 5, FIG. 6, FIG. 8, FIG. 9, and FIG. 15, a fourteenth embodiment of the present invention is shown. The fourteenth embodiment is a device for buffering the surface 14 of a countertop on a cabinet 10 while at the same time maintaining the surface's 14 visual appearance. The fourteenth embodiment is the same as the second embodiment with the exception that sheet 26 is replaced with sheet 54. Note that the concave cavities 56 and 58 are facing upward in FIG. 15 and that the depth of the cavities 58 terminate at a ridge and not flat, therefore their end is shown as a straight line. The cross sections of sheet 54 may be somewhat similar to those shown in FIG. 5, FIG. 6, FIG. 8 and FIG. 9.

Operation of the Fourteenth Embodiment

Figure 15:
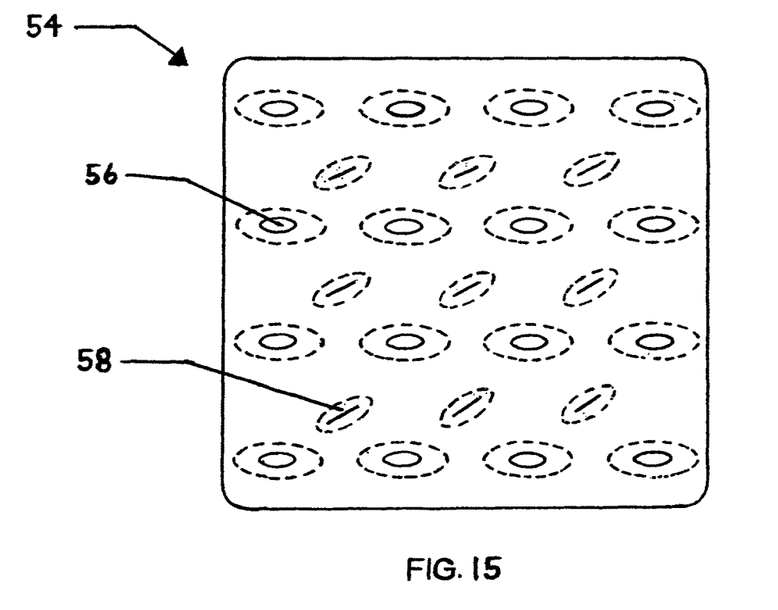
FIG. 15 is a first surface view of a silicone sheet of the present invention having concave cavities with corresponding convex protrusions with mixed shapes of different orientations with the cavities facing upward.

The operation of the fourteenth embodiment is the same as the second embodiment with the exception that sheet 26 is replaced with sheet 54.

Fifteenth Embodiment—FIG. 1, FIG. 2, FIG. 3 and FIG. 15

Referring to FIG. 1, FIG. 2, FIG. 3 and FIG. 15, a fifteenth embodiment of the present invention is shown. The fifteenth embodiment relates to a method of buffering the surface 14 of a countertop on a cabinet 10 while at the same time maintaining the surface's 14 visual appearance. The fifteenth embodiment is the same as the first embodiment with the exception that sheet 12 is replaced with sheet 54. Furthermore, similar to the second embodiment, either the cavities 56 and 58 side or the corresponding protrusions side, as dependent on the applicable design (reference the second embodiment), is positioned adjacent to the countertop surface 14.

Sixteenth Embodiment—FIG. 5, FIG. 6, FIG. 8, FIG. 9, and FIG. 16

Referring to FIG. 5, FIG. 6, FIG. 8, FIG. 9, and FIG. 16, a sixteenth embodiment of the present invention is shown. The sixteenth embodiment is a device for buffering the surface 14 of a countertop on a cabinet 10 while at the same time maintaining the surface's 14 visual appearance. The sixteenth embodiment is the same as the second embodiment with the exception that sheet 26 is replaced with sheet 60. Note that sheet 60 has both concave cavities 64 with corresponding convex protrusions 62, and protrusions 62 with corresponding cavities 64 on both its first and second sides.

Operation of the Sixteenth Embodiment

Figure 16:
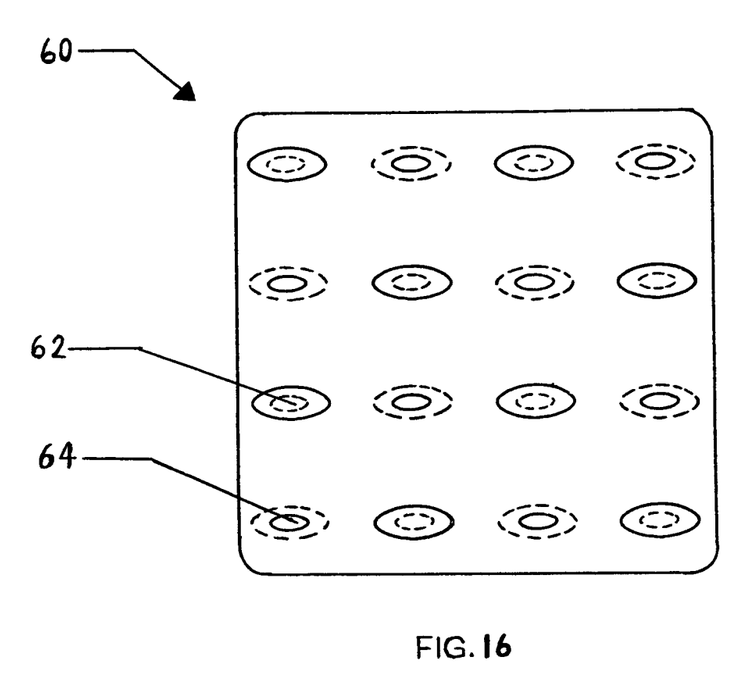
FIG. 16 is a first surface view of a silicone sheet of the present invention having both concave cavities with corresponding convex protrusions and protrusions with corresponding cavities on both its first and second sides.

The operation of the sixteenth embodiment is the same as the second embodiment with the exception that sheet 26 is replaced with sheet 60. Note that the first side of sheet 60 can be specifically designed to be positioned on the countertop surface 14 or the second side of sheet 60 can be specifically designed to be positioned on the countertop surface 14.

Figure 17:
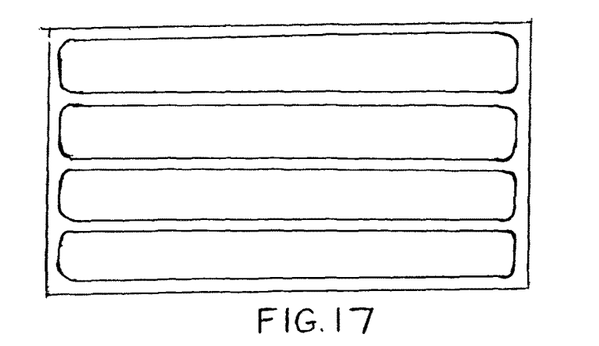
FIG. 17 is an alternative embodiment of the invention.

FIG. 17 is an upper surface view of a silicone sheet of the present invention having concave cavities facing up with corresponding convex protrusions that form more than one channel.

Figure 18:
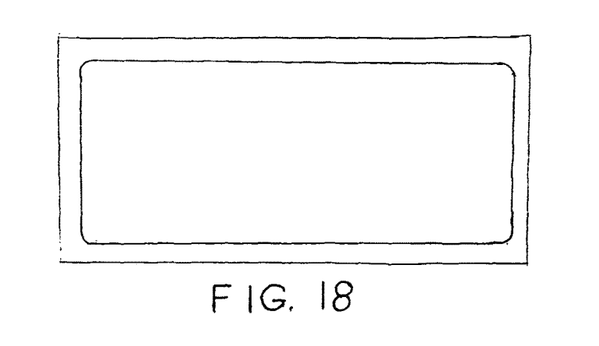
FIG. 18 is an alternative embodiment of the invention.

FIG. 18 is an upper surface view of a silicone sheet of the present invention having a concave cavity facing up with a corresponding convex protrusion that runs from one end of the silicone sheet to the other.

Figure 19:
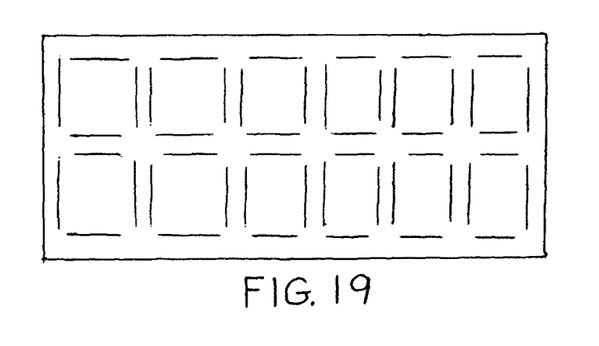
FIG. 19 is an alternative embodiment of the invention.

FIG. 19 is an upper surface view of a silicone sheet of the present invention having concave cavities facing up with corresponding convex protrusions of a cavity within a section, with multiple sections.

Figure 20:
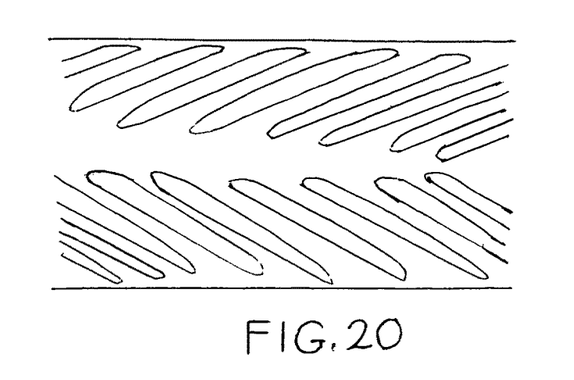
FIG. 20 is an alternative embodiment of the invention.

FIG. 20 is an upper surface view of a silicone sheet of the present invention having concave cavities facing up with corresponding convex protrusions that are angled.

Figure 21:
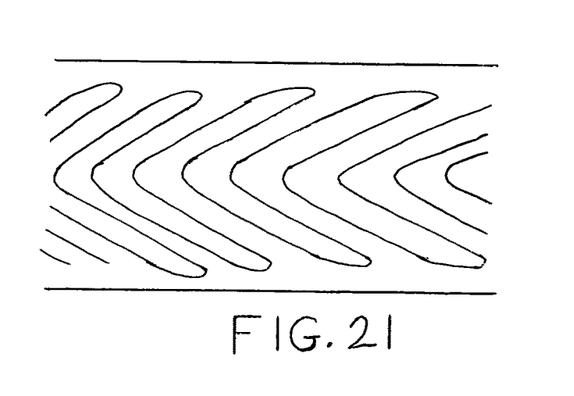
FIG. 21 is an alternative embodiment of the invention.

FIG. 21 is an upper surface view of a silicone sheet of the present invention having concave cavities facing up with corresponding convex protrusions.

Figure 22:
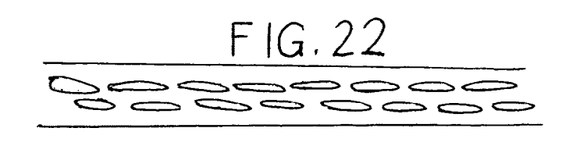
FIG. 22 is an alternative embodiment of the invention.

FIG. 22 is an upper surface view of a silicone sheet of the present invention having concave cavities facing up with corresponding convex protrusions that form an adapted chevron with cavities and protrusions that are open on one side.

Figure 23:
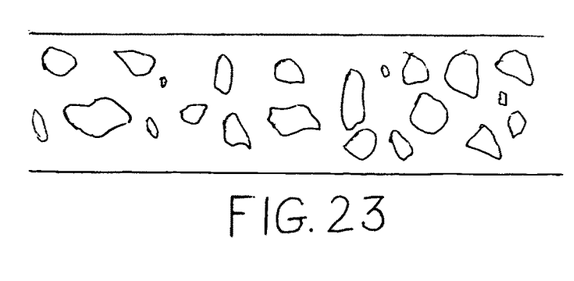
FIG. 23 is an alternative embodiment of the invention.

FIG. 23 is an upper surface view of a silicone sheet of the present invention having concave cavities facing up with corresponding convex protrusions that are random shapes.

Figures 24, 25:
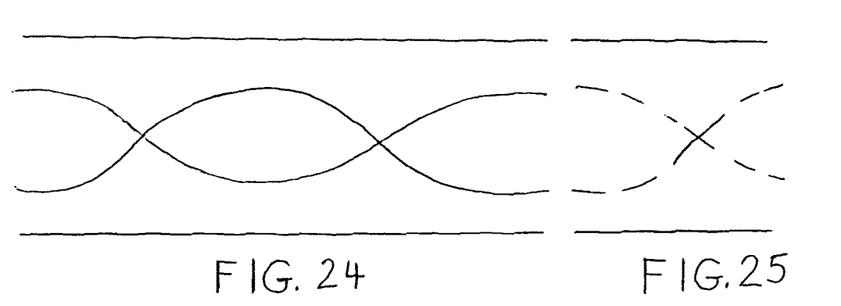
FIG. 24 is an alternative embodiment of the invention.
FIG. 25 is an alternative embodiment of the invention.

FIG. 24 is an upper surface view of a silicone sheet of the present invention having concave cavities facing up with corresponding convex protrusions that touch at the end.

FIG. 25 is an upper surface view of a silicone sheet of the present invention having concave cavities facing down with corresponding convex protrusions.

Figure 26:
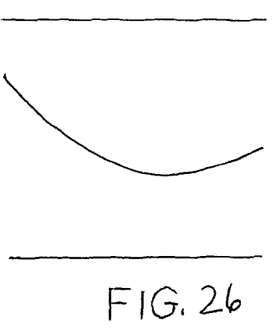
FIG. 26 is an alternative embodiment of the invention.

FIG. 26 is an upper surface view of a silicone sheet of the present invention having a concave cavity facing up with a corresponding convex protrusion in the shape of a wave.

Figure 27:
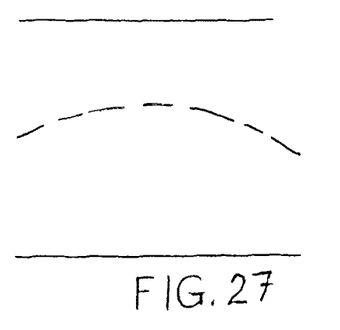
FIG. 27 is an alternative embodiment of the invention.

FIG. 27 is an upper surface view of a silicone sheet of the present invention having concave cavities facing down with corresponding convex protrusions.

Figure 28:
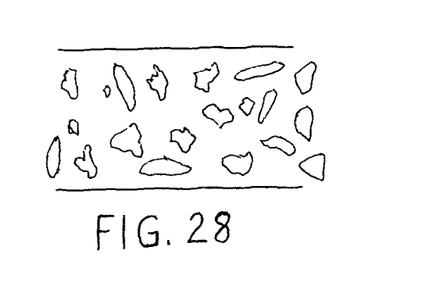
FIG. 28 is an alternative embodiment of the invention.

FIG. 28 is an upper surface view of a silicone sheet of the present invention having concave cavities facing up with corresponding convex protrusions of a random design, different from FIG. 23.

CONCLUSION, RAMIFICATIONS, AND SCOPE

Thus, a person of ordinary skill in the art will understand that the Device and Method for Buffering a Surface While Maintaining the Surface's Visual Appearance is simple, user friendly, inexpensive, as well as reliable and has many advantages, features, and benefits over the prior art.

While the aforementioned descriptions of the embodiments contain many specifics, these specifics should not be construed as limitations on the scope of the disclosed invention, but rather as an exemplification of several preferred embodiments thereof.

Many other ramifications, variations, alterations, substitutions, modifications, and the like are readily possible. For example, sizes, shapes, procedures, design, etc. of all components can be readily modified or changed.

For example, (1) the countertop surface 14 can be any type of generic surface used to place items on; (2) one or both surfaces of the silicone sheets 12, 26, 27, 38, 42, 48, 54, and modified sheet 26 shown in all embodiments can have a plurality of small texture configurations, lines or any shapes some of which may have the texture of sandpaper, to prevent or reduce slippage or sticking of utensils placed thereupon; (3) the thickness of the sheets 12, 26, 27, 38, 42, 48, 54, 60, and modified sheet 26 as generically represented between the peak of protrusions 28 and peak of cavities 30 can be different from the generically represented thickness 32 as well as with all protrusions and their respective cavities, herein; (4) the thickness, as generically represented by thickness 32, can vary within their respective sheets and can vary with the thickness as stated in (3) above; (5) the peaks of the protrusions 28, 40, 44, 46, 50, 52, and 62 as well as all protrusions, herein, do not have to be flat, as generally shown in FIGS. 4-14 and 16 but can be domed or spherical shaped; (6) the protrusions 28 and their corresponding cavities 30 as well as all protrusions, herein, including protrusions 40, 44, 46, 50, 52, and 62 and their corresponding cavities can have any shape or configuration different from those shown in their respective embodiments; (7) the sheets 26, 27, 38 42, 48, 54, and 60, and modified sheet 26 can have both protrusions and cavities of any configuration on the same side of the sheet; (8) the sheets 26, 27, 38, 42, 48, 54, 60, and modified sheet 26 can have protrusions with corresponding cavities of any shape, width/length, and height and can be intermixed with protrusions and cavities having different shapes, widths/lengths and heights; (9) excess wetting agent 15 and air can be removed by moving any flat and/or curved object on the silicone sheets 12, 26, 27, 38, 42, 48, 54, 60, and modified sheet 26 with a sufficient force directed toward the sheets 12, 26, 27, 38, 42, 48, 54, 60, and modified sheet 26; (10) the silicone used in sheets 12, 26, 27, 38, 42, 48, 54, 60, and modified sheet 26 can have anti-bacterial and/or anti-microbial constituents and additionally, can be of any softness, resiliency and/or tensile strength and (11) the silicone used in sheets 12, 26, 27, 38, 42, 48, 54, 60, and modified sheet 26 can have a thickness of 4 mm or less.

With respect to the present invention, silicone is further defined as any material that is resiliently deformable, heat resistant and substantially transparent in a similar measure to these qualities of silicone.

While a number of exemplary aspects and embodiments have been discussed above, those skilled in the art will recognize certain modifications, permutations, additions and sub-combinations thereof. It is therefore intended that the following to appended claims are interpreted to include all such modifications, permutations, additions and sub-combinations as are within their true spirit and scope.

Accordingly, the scope and meaning should be determined not only by the embodiments illustrated, but by the appended claims and their legal equivalents.

The invention claimed is:

1. A device comprising:
   a sheet having a first surface and a second surface such that said first surface and said second surface are substantially opposite each other, said first surface having a first plurality of concave cavities and said second surface having a first plurality of convex protrusions corresponding to said first plurality of concave cavities,
   wherein a height of said concave cavities corresponds to a height of said convex protrusions throughout said sheet,
   wherein a width of said concave cavities corresponds to a width of said convex protrusions throughout said sheet,
   wherein said concave cavities and said convex protrusions throughout said sheet are configured to be flattened to cause said sheet to stabilize in place on a generic surface by removing at least one of excess air or wetting agent disposed between the second surface of said sheet and the generic surface, and
   wherein the second surface is facing the generic surface.

2. The device as defined in claim 1 wherein said sheet has a thickness of 4 mm or less.

3. The device as defined in claim 1 wherein one or both of said first surface and said second surface has texture.

4. The device as defined in claim 1 wherein said sheet has a second plurality of convex protrusions on said first surface, and a second plurality of concave cavities on said second surface, said second plurality of concave cavities corresponding to said second plurality of convex protrusions.

5. The device as defined in claim 1 wherein said sheet has a substantially flat portion adjacent to said first plurality of concave cavities and corresponding said first plurality of convex protrusions, and wherein the thickness of said substantially flat portion is greater than the thickness between each concave cavity of said first plurality of concave cavities and each corresponding convex protrusion of said first plurality of convex protrusions.

6. The device as defined in claim 1 wherein said sheet contains at least one of an anti-bacterial and anti-microbial constituent.

7. A device comprising:
a sheet having a first surface and a second surface opposite said first surface;
a plurality of concave cavities formed on said first surface; and
a plurality of convex protrusions formed on said second surface,
wherein each concave cavity is formed within a corresponding convex protrusion,
wherein said sheet has substantially flat portions adjacent to said concave cavities and convex protrusions,
wherein said sheet has at least two discrete portions, a first of said discrete portions comprising a first corresponding concave cavity and convex protrusion, and a second of said discrete portions comprising a second corresponding concave cavity and convex protrusion, said discrete portions being separated from each other by said substantially flat portions,
wherein a thickness of said substantially flat portions is different than a thickness between said concave cavities and convex protrusions throughout said sheet,
wherein a transition from said concave cavities and convex protrusions to said substantially flat portions forms a flattened "S" shape, and
wherein said concave cavities and convex protrusions are configured to be flattened to make said sheet adhere to a generic surface by removing at least one of excess air or wetting agent disposed between said sheet and the generic surface.

8. The device as defined in claim 7 wherein at least one of said concave cavities and at least one of said convex protrusions have at least one of a different shape, width, and height.

9. The device as defined in claim 7 wherein the generic surface is a household surface.

10. A device comprising:
a sheet having a first surface and a second surface such that said first surface and said second surface are substantially opposite each other, said first surface having at least one concave cavity and said second surface having at least one convex protrusion corresponding to said at least one concave cavity, said at least one concave cavity formed within said at least one convex protrusion,
wherein a height of said at least one concave cavity corresponds to a height of said at least one convex protrusion,
wherein a width of said at least one concave cavity corresponds to a width of said at least one convex protrusion,
wherein said sheet has a substantially flat portion adjacent to said at least one concave cavity and said at least one convex protrusion, and
wherein said at least one concave cavity and said at least one convex protrusion are configured to be flattened to cause said sheet to stabilize in place on a generic surface by removing at least one of excess air or wetting agent disposed between said sheet and the generic surface.

11. The device as defined in claim 1 wherein said sheet is tinted.

12. The device as defined in claim 7 wherein said sheet has a second plurality of convex protrusions on said first surface, and a second plurality of concave cavities on said second surface, said second plurality of concave cavities corresponding to said second plurality of convex protrusions.

13. The device as defined in claim 1 wherein said concave cavities and convex protrusions are configured to be flattened to cause said sheet to stabilize in place on the generic surface by removing the excess air between said sheet and the generic surface.

14. The device as defined in claim 1 wherein said concave cavities and convex protrusions are configured to be flattened to cause said sheet to stabilize in place on the generic surface by removing the excess wetting agent disposed between said sheet and the generic surface.

15. The device as defined in claim 5, wherein said sheet is configured to have a substantially uniform distance throughout said sheet between the first surface of said sheet and the generic surface after said sheet is stabilized in place by flattening said concave cavities and said convex protrusions.

16. The device as defined in claim 7, wherein the thickness of said substantially flat portions is greater than the thickness between said concave cavities and said convex protrusions throughout said sheet.

17. The device as defined in claim 7 wherein said substantially flat portions and said adjacent concave cavities and convex protrusions are configured to be flattened to make said sheet adhere to the generic surface by removing the excess wetting agent disposed between said sheet and the generic surface.

18. The device as defined in claim 10 wherein said at least one cavity and said at least one protrusion are configured to be flattened to cause said sheet to stabilize in place on the generic surface by removing the excess wetting agent disposed between said sheet and the generic surface.

19. The device as defined in claim 10 wherein said first surface is configured to be positioned adjacent to the generic surface and said second surface is designed to be positioned away from the generic surface.

20. The device as defined in claim 10 wherein said second surface is configured to be positioned adjacent to the generic surface and said first surface is designed to be positioned away from the generic surface.

21. The device as defined in claim 7 wherein said substantially flat portions and said adjacent concave cavities and convex protrusions are configured to be flattened to make said sheet adhere to the generic surface by removing the excess air disposed between said sheet and the generic surface.

22. The device as defined in claim 10 wherein said at least one cavity and said at least one protrusion are configured to be flattened to cause said sheet to stabilize in place on the generic surface by removing the excess air disposed between said sheet and the generic surface.

* * * * *